(12) United States Patent
Fristedt

(10) Patent No.: US 7,567,045 B2
(45) Date of Patent: Jul. 28, 2009

(54) METHOD AND ARRANGEMENT FOR CONTROL OF DIRECT CURRENT MOTOR

(75) Inventor: Tommy Fristedt, Bottnaryd (SE)

(73) Assignee: Kongsberg Automotive AB, Mullsjo (SE)

( * ) Notice: Subject to any disclaimer, the term of this patent is extended or adjusted under 35 U.S.C. 154(b) by 207 days.

(21) Appl. No.: 10/562,267

(22) PCT Filed: Jun. 24, 2004

(86) PCT No.: PCT/SE2004/001031

§ 371 (c)(1),
(2), (4) Date: May 26, 2006

(87) PCT Pub. No.: WO2004/114513

PCT Pub. Date: Dec. 29, 2004

(65) Prior Publication Data

US 2007/0048121 A1    Mar. 1, 2007

(30) Foreign Application Priority Data

Jun. 26, 2003    (SE) .................................... 0301871

(51) Int. Cl.
*H02P 6/00* (2006.01)
(52) U.S. Cl. .................................. 318/400.01; 318/599
(58) Field of Classification Search ................ 318/599, 318/400.01, 400.08, 461, 471; 388/800, 388/804, 811, 819, 934
See application file for complete search history.

(56) References Cited

U.S. PATENT DOCUMENTS

| | | | | |
|---|---|---|---|---|
| 5,075,537 A | * | 12/1991 | Lorenzen et al. | ............ 219/497 |
| 5,727,928 A | * | 3/1998 | Brown | ...................... 417/44.11 |
| 5,981,918 A | * | 11/1999 | Topp et al. | .................. 219/499 |
| 6,008,603 A | | 12/1999 | Jones et al. | |
| 6,054,823 A | * | 4/2000 | Collings et al. | ........ 318/400.04 |
| 6,381,406 B1 | | 4/2002 | Smith et al. | |
| 6,619,736 B2 | | 9/2003 | Stöwe et al. | |

(Continued)

FOREIGN PATENT DOCUMENTS

DE    100 09 128 C1    8/2001

(Continued)

*Primary Examiner*—Rina I Duda
(74) *Attorney, Agent, or Firm*—Merchant & Gould P.C.

(57) ABSTRACT

The present invention relates to a method for control of a direct current motor in one or several fan units, each comprising a fan, which method comprises: generation of a control signal from a first control unit which is external in relation to the said fan unit; transmission of the said control signal to the said fan unit; reception of the transmitted control signal in the said fan unit; interpretation of the said control signal in a second control unit which is arranged in association with the said fan unit; and generation, in the said second control unit, of a supply signal for the said direct current motor, on the basis of the control signal generated by the first control unit and received in the fan unit and on the basis of a supply voltage. According to the invention, the method comprises transmission of the control signal together with the supply voltage over a shared communication link, with the control signal being superposed on the supply voltage. The invention also relates to an arrangement for such control. By means of the invention, improved control is obtained of a motor that can be utilized in a ventilated seat in a vehicle.

22 Claims, 3 Drawing Sheets

U.S. PATENT DOCUMENTS

| | | | |
|---|---|---|---|
| 6,732,534 B2 * | 5/2004 | Spry .......................... | 62/3.7 |
| 2001/0028185 A1 | 10/2001 | Stowe et al. | |
| 2002/0078630 A1 | 6/2002 | Lee et al. | |
| 2002/0150478 A1 * | 10/2002 | Aoki ........................ | 417/44.1 |

FOREIGN PATENT DOCUMENTS

| | | |
|---|---|---|
| WO | 01/36230 A2 | 5/2001 |
| WO | WO 02/06914 A1 | 1/2002 |

* cited by examiner

METHOD AND ARRANGEMENT FOR CONTROL OF DIRECT CURRENT MOTOR

TECHNICAL FIELD

The present invention relates to a method for control of a direct current motor in one or several fan units, each comprising a fan, which method comprises: generation of a control signal from a first control unit which is external in relation to the said fan unit; transmission of the said control signal to the said fan unit; reception of the transmitted control signal in the said fan unit; interpretation of the said control signal in a second control unit which is arranged in association with the said fan unit; and generation, in the said second control unit, of a supply signal for the said direct current motor, on the basis of the control signal generated by the first control unit and received in the fan unit and on the basis of a supply voltage.

The invention also relates to an arrangement for controlling a direct current motor in a fan unit, which arrangement comprises a first control unit, which is external in relation to the said fan unit, a communication link between the said first control unit and the said fan, a second control unit arranged in association with the said fan unit and arranged to generate a supply signal for the said direct current motor, on the basis of a control signal generated by the first control unit and transmitted via the said communication link, and on the basis of a supply voltage.

The invention also relates to a method for controlling a direct current motor for a fan arranged for ventilation of a vehicle seat.

The invention also relates to an arrangement for ventilating a vehicle seat, which arrangement comprises a fan, a direct current motor and a control unit.

BACKGROUND ART

Nowadays, for reasons associated with comfort and safety, seats in vehicles are ventilated. For this purpose, both the driver's seat and other seats in a vehicle can be provided with ventilation ducts that lead from a fan located in the vicinity of the seat to one or several openings in the seat. Such openings are normally located in the seat cushion, but can also be located in the seat back. The fan can be arranged so that it either blows air or extracts air. In this way, ventilation of the surface of the vehicle seat is achieved, which in turn gives the driver or passenger sitting on the seat in question an increased feeling of comfort.

A problem with previously-known arrangements for forced ventilation of vehicle seats is the difficulty in obtaining an accurately controlled temperature at the surface of the seat. WO 02/06914 shows an arrangement for temperature control of a vehicle seat comprising a fan for ventilating the said seat.

This design does not, however, allow any precise control of the fan for obtaining as accurately controlled a temperature as possible at the surface of the seat.

In a general context, methods for controlling the speed of rotation and output of a direct current motor by means of pulse width modulation, abbreviated as PWM, are currently known. In pulse width modulation, the direct current motor is driven by a pulse train generated in an external control unit, which means that during the pulse train's positive live phases, the direct current motor is live, while during the dead phases of the pulse train, the direct current motor is dead. Thus, during a supply period, the direct current motor receives drive voltage from and including a rising edge up to and including a falling edge.

The best conditions have normally been achieved when the switching frequency of the pulse-modulated signal is considerably higher than the speed of rotation of the motor, whereby the output of a conventional direct current supply is obtained. A theoretical rule of thumb for obtaining the correct switching frequency is that the switching frequency must be higher than $1/Ta$ where $Ta=L/R$ is the electrical time constant of the motor. Here L is the inductance of the motor and R is the internal resistance of the motor. Normally, switching frequencies are used that are within the approximate range 20 Hz-200 kHz, which can mean that audible dissonance from the motor arises or that electrical interference arises caused by the pulse width modulation.

For brushless direct current motors, a position sensor is required, which informs the driving electronics about the phase angle of the rotor magnets in relation to the field magnets. The drive electronics apply current to the windings on the basis of the output signal from this sensor. This is called electronic commutation. A so-called Hall detector is normally used as the sensor for obtaining this commutating output signal.

The pulse width modulated supply is currently implemented in such a way that a direct current motor is supplied with a pulse train with a fixed frequency generated in an external control unit. By feeding back the speed of rotation to the control electronics, the width of the signals in this pulse train can be varied in such a way that the motor receives voltage for a shorter or longer time during each supply period. In this way, the speed of rotation and output of the direct current motor are proportional to the pulse width of the supply pulse.

U.S. Pat. No. 6,381,406 shows how a direct current motor for cooling electronic equipment is connected to a pulse width modulated signal. The direct current motor emits an output signal in the form of a feedback signal "TACH" that corresponds to the speed of rotation of the motor. This output signal "TACH" is compared with a reference signal "SYNCH" that corresponds to the required speed of rotation. When "TACH" deviates from "SYNCH", the pulse width is adjusted so that "TACH" and "SYNCH" conform with each other.

Patent DE10009128 C1 shows a fan for the ventilation of vehicle seats, where a control unit integrated in the fan unit is supplied with control signals from an external control unit. In turn, the control unit integrated in the fan unit supplies the fan motor with drive voltage on the basis of the control information received. This drive voltage for the fan motor comes in to the control unit integrated in the fan unit via a separate supply lead for drive voltage.

A disadvantage of previously known general technology for direct current motors is that a large amount of cabling is required in order to achieve both the transmission of signals and the transmission of power. This is also associated with disadvantages associated with the need to use pulse width modulation with a high pulse frequency in order to avoid audible dissonance that originates from the pulse width modulated supply, as this gives rise to problems with electromagnetic interference, commonly given the abbreviation EMC (ElectroMagnetic Compatibility), caused by the high frequency of the switched signal.

DISCLOSURE OF INVENTION

An object of the present invention is to provide an improved method and device for controlling a motor driven by direct current that do not have the disadvantages that are stated above and that can be equipped with a smaller amount of cabling in comparison with known technology.

This object is achieved by means of a method of the type described in the introduction, which method is characterized in that it also comprises the transmission of the control signal together with the supply voltage over a shared communication link, with the control signal being superposed on the supply voltage.

The object is also achieved by means of an arrangement of the type described in the introduction, which arrangement is characterized in that the communication link is arranged to transmit the supply voltage together with the said control signal.

It is also an object of the present invention to provide a method and a device for controlling a fan for the ventilation of a vehicle seat. This object leads to a more accurately controlled seat temperature for a vehicle seat.

This object is achieved by means of a method of the type mentioned in the introduction, which method is characterized in that it comprises control of the speed of rotation of the said direct current motor.

The object is also achieved by an arrangement of the type mentioned in the introduction, which arrangement is characterized in that the said control unit is arranged to control the speed of rotation of the said direct current motor.

The invention has certain advantages. Firstly, a flexible solution is obtained with effective coordination from a central control unit, and a complete fan control unit is obtained that receives control information from a central control unit. In addition, a low cost is achieved as a result of the two-wire control of the fan unit. In addition, a more controlled seat temperature is obtained for a vehicle seat as the speed of rotation of the fan is controlled in response to the temperature in question, and a more controlled seat temperature is obtained for a vehicle seat as a heating element is controlled in association with the said fan. An additional advantage of the invention is that it is possible to control the fan motor at very low speeds of rotation, which is particularly advantageous in vehicle seats, not least because the application requires relatively large motors (in order to be able to provide a high output), which are difficult to run at low output. This problem is solved by means of the invention.

BRIEF DESCRIPTION OF DRAWINGS

The invention will be described in detail in the following, with reference to the attached drawings. These drawings are used only for illustrative purposes, and are not to be regarded as limiting the scope of the present invention. In the figures.

PREFERRED EMBODIMENTS

Figure 1:
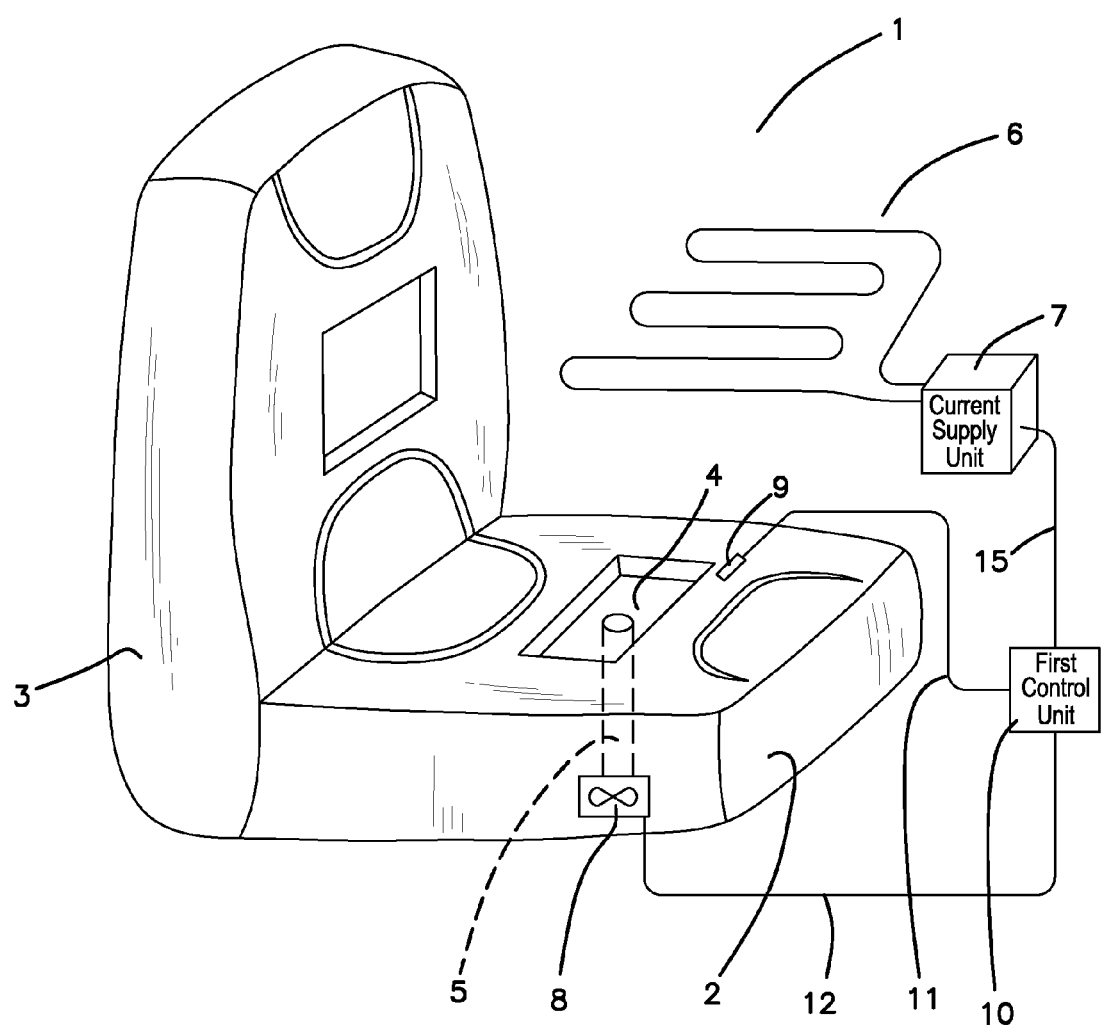
FIG. 1 shows a perspective view of a vehicle seat in which the present invention can be utilized.

The present invention will now be described in greater detail, firstly with reference to FIG. 1.

For increased comfort, the seat cushion 2 and seat back 3 of a vehicle seat 1 can be equipped for ventilation and temperature control of the surfaces or areas upon which a driver or passenger in the vehicle is expected to sit. In the following, the seat cushion 2 will be described, but a corresponding description can, of course, apply for the seat back 3. In a vehicle, both the driver's seat and the other seats can be equipped for ventilation by blowing or extraction of air. The blown or extracted air is distributed via at least one opening 4 that is arranged in the seat cushion 2. In the case of the blowing of air, this blown air is led through a duct 5 in the seat cushion 2 and out towards the person who is sitting on the seat in question, via the distributing opening 4. In the case of the extraction of air, this extracted air is led away from the person who is sitting on the seat in question through the duct 5 in the seat cushion 2 via the distributing opening 4.

The temperature control of the seat cushion 2 can be carried out in the form of cooling of the provided air, or alternatively by heating the seat cushion by means of a separate, electrically-heated heating element 6. The heating element 6 can, for example, consist of electrically conducting wires that are placed in the form of a heating loop 6 in the seat cushion 2. As the heating element 6 is connected to a current supply unit 7 which provides current, the heating element 6 can be heated up to a suitable temperature. The principle for temperature regulation using such a heating element 6 is already known and is therefore not described here in detail.

The blowing or extraction of air is preferably carried out using a fan 8 that is driven by a direct current motor. By regulating the speed of the fan 8, a particular quantity of air can be supplied to or taken from the seat cushion 2. In this way, a precisely regulated temperature can be obtained on the surface of the seat if a temperature sensor 9 arranged in the seat is arranged to communicate with a first control unit 10 for controlling the fan 8 via a first link 11, which first control unit 10 is external in relation to the fan 8. The fact that the first control unit 10 is external means that it is not arranged in the same physical casing or the like as the fan 8, but consists of a central control unit for the temperature control and ventilation of the seat 1 and is used for operating the heating element 6 and the fan motor 8.

The control of the speed of rotation of the fan 8 is preferably carried out by a supply of the pulse width modulation (PWM) type. By this means, the fan is supplied with a pulse train generated in the first control unit 10 via a second link 12, which means that the fan 8 is live during the positive live phases of the pulse train, while it is dead during the dead phases of the pulse train. Thus, during a supply period of the pulse width modulated supply, the fan 8 obtains drive voltage from and including the rising edge up to and including the falling edge. The supply can have a frequency that lies within the approximate range 20 Hz-200 kHz, that is within a wide frequency range. It should, however, be noted that the invention is not limited to the supply having to be carried out at a certain particular frequency or within a certain particular frequency range.

If the temperature sensor 9 detects a temperature value that is such that the speed of rotation of the fan 8 should be increased, for example due to the detected temperature exceeding a predefined limit value, this is detected by the first control unit 10. This predefined limit value can, for example, depend upon a desired value that is set by the user. This desired value can either be linked to the temperature of the seat alone, or to the temperature of the vehicle in general, or to both these parameters. The first control unit 10 then increases the part of the pulse period when the fan is live. This corresponds to the duty cycle of the signal being increased.

Figure 2A:
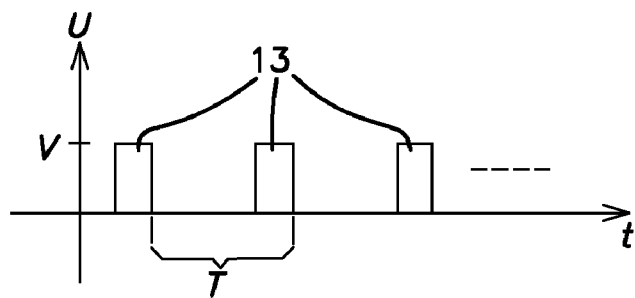
FIG. 2a shows a pulse width modulated pulse train with a certain pulse width.
Figure 2B:
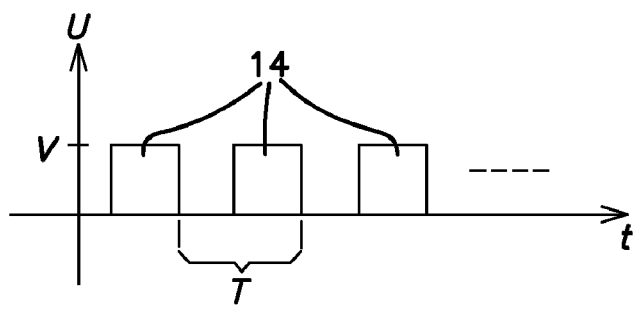
FIG. 2b shows a pulse width modulated pulse train of the same type as in FIG. 2a, but with increased pulse width.

This is illustrated by graphs in FIG. 2. FIG. 2*a* and FIG. 2*b* show the x-axis time t and the y-axis voltage U. FIG. 2*a* shows a pulse train 13 for the pulse width modulated supply with the peak value V and the period of time T before the detected temperature exceeds the predefined limit value. FIG. 2*b* shows a corresponding pulse train 14 for the pulse width modulated supply after the detected temperature has exceeded the predefined limit value and after the first control unit 10 shown in FIG. 1 has increased the duty cycle of the pulse train, that is has increased the part of the pulse period T when the fan 8 is live. As a result, the fan 8 is supplied with greater power than previously, whereby the speed of rotation and the output of the fan 8 are increased. The cooling of the seat 1 is thereby increased, which means that the detected temperature in the seat 1 drops. In a similar way, the part of the pulse period when the fan 8 is live is reduced when the detected temperature is less than a second predefined limit value that is also dependent upon the said desired value. There is, of course, a hysteresis between these limit values.

Thus, the first control unit 10 detects a temperature detected by the temperature sensor 9 and compensates by pulse width modulation in response to how this relates to a predefined limit value by changing the extent of time of the part of the pulse period when the fan 8 is live. This does not need to happen when certain predefined limit values are exceeded, but can be carried out continuously in accordance with a suitable algorithm for continuous control of the speed of rotation of the fan 8 on the basis of the temperature detected by the temperature sensor 9. It is not just the temperature that is measured by the sensor 9 that can constitute an input parameter for the regulation. The cab temperature and the humidity in the seat measured via other sensors (not shown), and the time and the user's selection of level for the fan can also constitute input parameters for the regulation. There can be separate functions for the temperature control and the ventilation outside or inside the first control unit 10, that is these functions do not need to be interconnected. The first control unit 10 varies continuously the part of the pulse period when the fan 8 is live in response to the temperature detected by the temperature sensor 9 in comparison with the said limit values.

In a preferred embodiment of the said invention, which is illustrated in FIG. 1, the fan speed is regulated according to the above in combination with regulation of the power supplied to the said heating element 6 in the vehicle seat. Thus, in this case, the first control unit 10 regulates both the power supplied to the heating element and the pulse width in the pulse train associated with the pulse width modulated supply. The power supplied to the heating element is controlled by the first control unit 10 controlling the current supply unit 7 via a third link 15, in response to the temperature in the vehicle seat 1 detected by the temperature sensor 9.

Figure 3A:
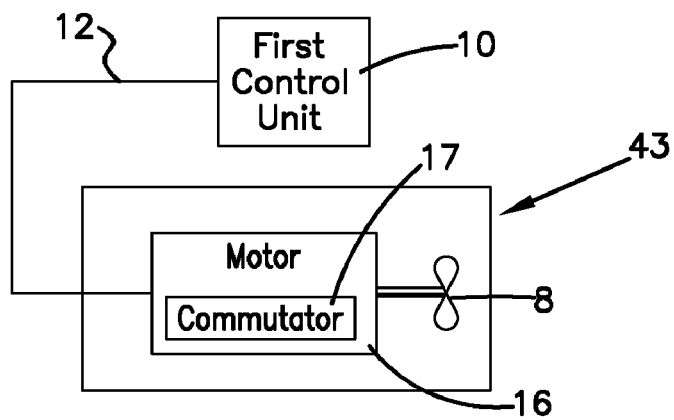
FIG. 3a shows an outline drawing of a fan unit according to the present invention, arranged with commutating feedback.
Figure 3B:
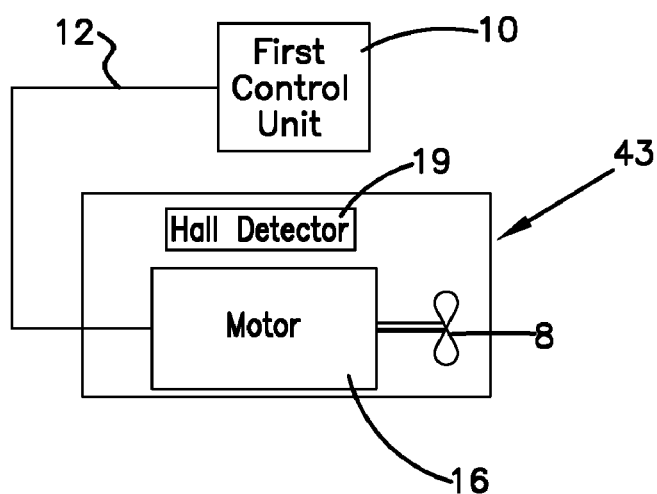
FIG. 3b shows an outline drawing of a fan unit according to the present invention, arranged with feedback from a Hall detector.

In an additional preferred embodiment with reference to FIG. 3*a*, a fan unit 43 is illustrated comprising feedback means, preferably via a commutator 17 arranged in the direct current motor 16 of the fan unit, which commutator can be either electronic or mechanical, which feedback means supply a feedback signal to a control unit (not shown in FIG. 3*a*) for controlling the fan. This feedback signal is proportional to the speed of rotation of the fan. Detection of the speed of rotation of the fan can also, for example, be carried out by a so-called Hall detector 19, as shown in FIG. 3*b*, or another known device for detecting the speed of rotation that supplies feedback values to the fan's control unit (not shown in FIG. 3*b*), in a way that is analogous to what has been described above with reference to FIG. 3*a*. Hall detectors are already known for detecting speed of rotation, and will therefore not be discussed in greater detail here. By this means, it is possible to monitor the speed of rotation of the fan continuously. This has several advantages. Among other things, it is possible to detect whether the bearings (not shown) of the fan 8 have become so worn that the speed of rotation of the fan 8 does not correspond to the power supplied, or whether the speed of rotation of the fan 8 is abnormal in some other way in relation to the power supplied. In particular, it is possible to synchronize the frequency of the pulse train of the pulse width modulated supply to the speed of rotation of the fan 8. By synchronization it is meant here that the frequency of the pulse width modulated supply is equal to the speed of rotation of the fan, or alternatively is a whole-number multiple or a whole-number fraction of the speed of rotation of the fan, or in general is related in a predetermined way to the speed of rotation of the fan. An advantage of this is that a relatively low frequency can be used for the pulse width modulated supply, while at the same time problems associated with dissonance and vibrations are reduced. Lower frequencies for the pulse width modulated supply means that simpler equipment can be used for generating the pulse width modulated supply, while at the same time problems associated with electromagnetic compatibility caused by the high frequency of the switched signal are reduced. A precondition for this is that the first control unit 10 is equipped with means for regulating the frequency of the pulse train of the pulse width modulated supply.

Even if the fan unit 43 does not comprise the said feedback means 17, 19, a value for the speed of rotation of the fan 8 can be estimated on the basis of the appearance of the pulse width modulated supply at the relevant moment in time, so that the abovementioned regulation of the frequency of the pulse width modulated supply can be carried out on the basis of these estimated values.

Figure 4:
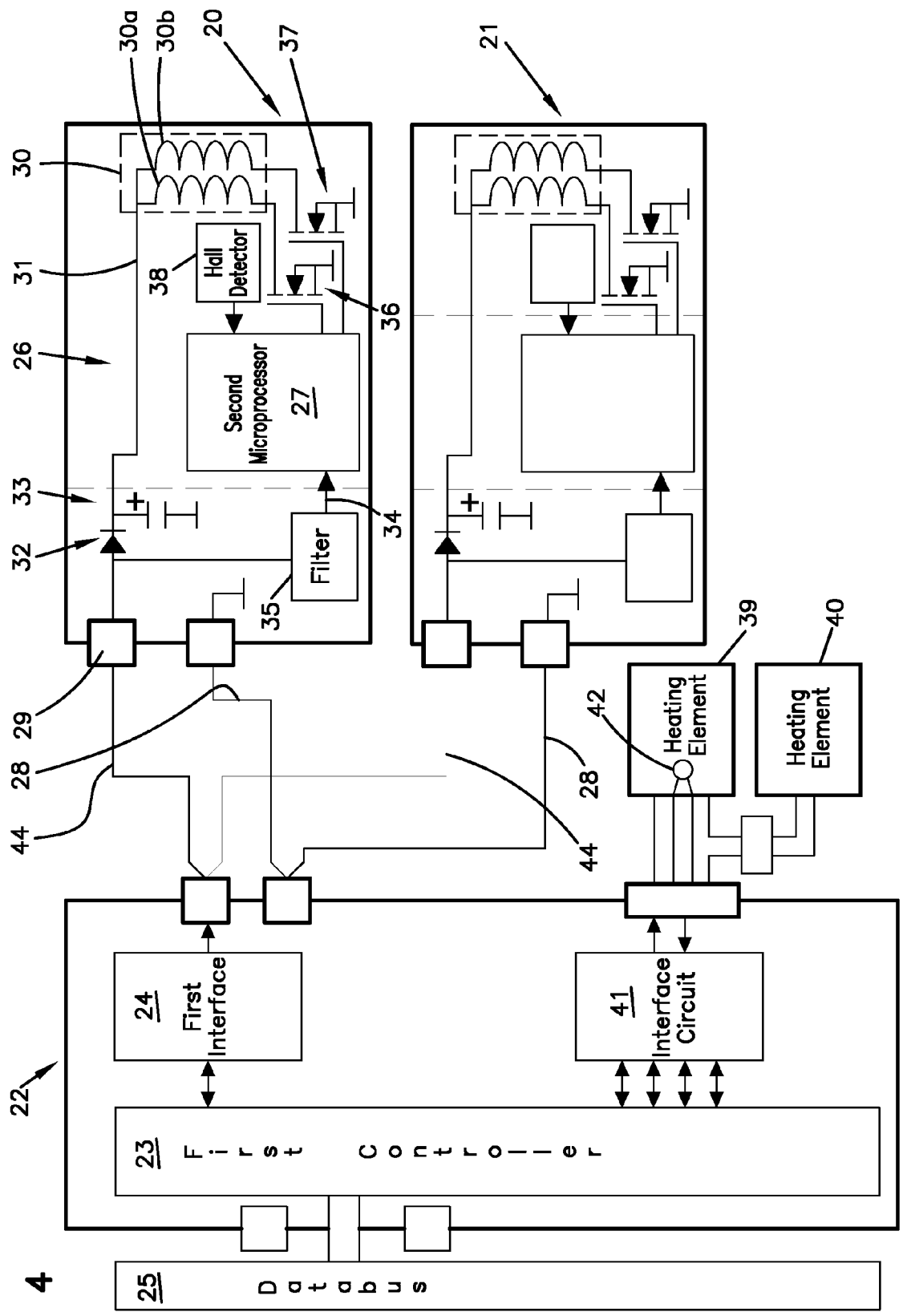
FIG. 4 shows schematically a system according to an additional embodiment of the present invention.

A preferred embodiment for general control of direct current motors, in particular control of direct current motors in fans for ventilating vehicle seats, is illustrated in FIG. 4. The figure shows a first fan unit 20 and a second fan unit 21, intended for separate vehicle seats in the same vehicle, which fan units 20, 21 are supplied in parallel. The first fan unit 20 is described below, but the second fan unit 21 has suitably an identical design and function. Note that the fan units 20, 21 can also be connected in series, and that both more than and fewer than the two fan units 20, 21 shown can be used for fan-cooling of the vehicle seats. The first fan unit 20 is equipped with means for communicating with an external control unit 22 corresponding to the abovementioned first control unit, for which reason it is also called here a first control unit. The first control unit 22 consists of a central air-conditioning control unit for one or several seats in a vehicle.

The first control unit 22 is constructed of a first microcontroller 23 and an interface circuit 24 that constitutes an interface for serial communication with the fan units 20, 21. In the embodiment that is illustrated in FIG. 4, this drive circuit 24 consists of an IC of the MOSFET type. The first control unit 22 is also connected to a databus 25 for communication with other control systems (not shown) in the vehicle.

The fan unit 20 is also equipped with means for generating a supply signal to a direct current motor 30 in the fan unit 20, which supply signal consists preferably of a pulse width modulated signal (PWM signal). Other supply signals are also possible within the framework of the present invention, for example, via any type of known voltage regulator.

The fan unit 20 is here also equipped with means for controlling electronic commutation. These means are preferably contained in a second control unit 26, preferably constructed of a second microprocessor 27 in the said fan unit 20, with communication between the first control unit 22 and the second control unit 26 being carried out via a single cable 44 equipped for serial communication. In addition to the said signal cable 44, the said first control unit 22 and second control unit 26 have a shared earth lead 28.

The generation of the fan's supply signal is controlled by the first control unit 22, which communicates this controlling data signal in the form of a pulse train via the signal cable 44. In combination with this pulse train, the fan unit receives supply voltage via the signal cable 44. The pulse train has preferably a frequency that is partially dependent upon the characteristics of the seat. How low a frequency is suitable is limited by sound phenomena that arise, while how high a frequency is suitable is limited by tolerable electromagnetic interference levels. An example of a suitable frequency range is 50 Hz-500 Hz, depending upon the speed of rotation of the motor. In this way, problems with EMC (ElectroMagnetic Compatibility) are reduced. The pulse train transmits data in the form of binary code, but other suitable data coding can also be used within the framework of the invention.

After the input 29 of the fan unit 20, the input signal is divided up so that it reaches both the fan's direct current motor 30 and the second control unit 26 comprised in the fan. At the supply input 31 of the direct current motor 30, there is a diode 32 and a stabilizing capacitor 33 with the task of maintaining the supply voltage for the direct current motor 30 irrespective of the appearance of the pulse train at the relevant moment in time. The diode 32 and the capacitor 33 also remove electrical interference that can prevent the second control unit 26 from reading the transmitted serial information. The nominally high level of the pulse train is thus at the same level as the supply voltage of the direct current motor 30. When the pulse train has a low level, it corresponds to the approximate earth level in the system. By this means, as mentioned above, the said capacitor 33 maintains the supply voltage so that the direct current motor 30 principally interprets the supply as a direct voltage supply.

At the signal input 34 of the second micro-controller 27, there is first a filter 35 in order that a filtered input signal can be obtained. Depending upon the time of the low level on the plus side of the filter or the data input, the second micro-controller 27 interprets this as a one or a zero. Thus one or several digital words are sent from the first control unit 22 to the second control unit 26, which digital words constitute an information train that is used as a control signal for the second control unit 26. On the basis of the control signal received from the first control unit 22, the second control unit 26 generates the pulse width modulated supply for controlling two commutating transistors 36, 37, whereby the speed of rotation and output of the direct current motor 30 are controlled by the second control unit 26 in response to the input signal received from the first control unit 22. Detectors 38 are arranged in the fan 20 for detecting the speed of rotation of the fan, which detectors are, for example, in the form of so-called Hall detectors. The control signal suitably defines digital words that indicate either how large a proportion of full motor output is to be utilized, or alternatively a precise value for a required speed of rotation of the fan. The control signal can, in addition, be coded with various types of protocol, which provide information that is intended to be transmitted with the control signal, for example comprising addresses for the respective fans, commands for starting and stopping the respective fans, control information for the speed of the respective fans and data relating to other functions for control of the respective fans.

The second control unit 26 generates a pulse width modulated signal, intended for the said transistors 36, 37, with high frequency, preferably outside the audible frequency range, so that the fan unit 20 does not hereby generate dissonance in response to the pulse width modulated supply. An example of a suitable frequency range is from 20 kHz-200 kHz. As a result of the high-frequency pulse width modulated supply only taking place inside the fan unit 20, EMC interference is kept at a relatively low level, as the fan unit 20 is relatively easy to screen against EMC. Alternatively, the previously mentioned solution where the pulse width modulated supply is frequency regulated in such a way that its frequency conforms to the speed of rotation of the direct current motor 30, can also be applied here.

In addition, the second control unit 26 can be arranged to detect and communicate any faults that occur to the first control unit 22. If, for example, the speed of rotation that is detected by the Hall detectors 38 does not conform to the expected speed of rotation for a given pulse width modulated supply, an error signal is sent to the first control unit 22 for communication to the operator of the fan. If required, the supply to the fan is then also cut off. Communication of other information can also take place. The transmission of information is carried out by the second control unit 26 emitting a binary pulse train through the windings of the fan motor 30. This information can be communicated both when the fan motor is in motion and when it is stationary. The information can suitably be transmitted by current pulses being generated in the winding or windings of the direct current motor in accordance with a predetermined pattern. This pattern corresponds to certain information, for example corresponding to certain fault situations, or other types of operating state. In addition, this information can be used to transmit identification Information (serial number, type of item, etc) for the fan unit 20, so that the first control unit 22 is able to identify the fan unit.

In order for the fan units 20, 21 in FIG. 3 to be able to be supplied with separate instructions concerning the required speed of rotation, they are provided with separate identities, so that instructions that are sent via the serial communication line 44 can be separated for each fan. This applies whether the fan units 20, 21 are connected in parallel to the first control unit 22 in accordance with FIG. 3, or whether they are connected in series. The information that is communicated to the respective fan unit 20, 21 can, in addition to the required speed of rotation, for example be how quickly the fan unit 20, 21 is to adapt to a new value, that is to say the rate of increase or reduction.

FIG. 4 also shows schematically heating elements 39, 40 for the seat cushion and the seatback respectively, which heating elements 39, 40 are connected to the same first control unit 22 as the fan units 20, 21. Here the first micro-controller 23 arranged in the first control unit 22 communicates with the heating elements 39, 40 via an interface circuit 41. By this means, the fan units 20, 21 and the heating elements 39, 40 are controlled in such a way that they interact so that the driver or passenger sitting on the vehicle seat obtains the required temperature for the surface of the seat as quickly as possible. FIG. 4 shows a temperature sensor 42 arranged in the seat cushion. This temperature sensor 42 communicates with the first control unit 22 via the said interface circuit 41.

It should be noted that the fan units 20, 21, that are described above and that are equipped with means 26 for serial communication with an external control unit 22 and means 26 for generating a pulse width modulated supply for the direct current motor 30 in the fan, can be used in all other situations where there is a need to control the speed of rotation and the output of a direct current motor. The fans for ventilation of vehicle seats described here are only an example of a preferred embodiment of this control system.

The invention is in no way limited to the embodiments described above, but can be varied freely within the framework of the following claims. For example, the fan, which is equipped with an inbuilt micro-controller connected to an external control unit, can also be used in the embodiment with mechanical commutation.

The invention can be realized with different types of fan motor, that is with different numbers of phases and different types of connections. In addition to the motor type that is shown in FIG. 4 in particular (with two transistors and two windings), the invention can utilize, for example, a motor with bridge-connected transistors in an H-bridge (which is known technology) or in some other configuration.

In addition, it is the case that the control information that is transmitted between the external control unit 22 and the second control unit 26 can relate not only to the speed and power of the respective fan, but also to its direction of rotation.

The invention claimed is:

1. Method for controlling a direct current motor in one or several fan units, each comprising a fan, which method comprises:
   generation of a control signal from a first control unit which is external in relation to the said fan unit;
   transmission of the said control signal to the said fan unit;
   reception of the transmitted control signal in the said fan unit;
   interpretation of the said control signal in a second control unit which is arranged in association with the said fan unit; and
   generation, in the said second control unit, of a supply signal for the said direct current motor, on the basis of the control signal generated by the first control unit and received in the fan unit and on the basis of a supply voltage; wherein the method further comprises:
   transmission of the control signal together with the supply voltage over a shared communication link, with the control signal being superposed on the supply voltage.

2. Method according to claim 1, wherein the said control signal is a binary data signal.

3. Method according to claim 2, wherein the said control signal constitutes a measurement of a certain required proportion of the maximal output of the said direct current motor or a certain required speed of rotation of the direct current motor's fan.

4. Method according to claim 1, wherein the said fan unit is used for ventilation of a vehicle seat.

5. Method according to claim 1, wherein information is communicated from the fan unit to the first control unit.

6. Method according to claim 5, wherein the said information is communicated via the windings of the direct current motor comprised in the fan unit, and wherein the method comprises generation of current pulses in a predetermined pattern in the windings of the direct current motor, which pattern corresponds to certain information.

7. Method according claim to 5, wherein the said information comprises data relating to operating state, fault diagnosis or identification information relating to the fan unit.

8. Method according to claim 1, wherein each fan unit is provided with an identity to make it possible to transmit information between the first control unit and one of several fan units.

9. Method according to claim 8, wherein it comprises coding of the said control signal in a way such that it reflects information about the said identity.

10. Method according to claim 1, wherein the first control unit regulates both the fan unit(s) and the heating element(s).

11. Method according to claim 1, wherein pulse width modulation is used for controlling of the direct current motor, and wherein the pulse frequency of the said pulse width modulation is varied in response to the detected speed of rotation.

12. Method according to claim 1, wherein the second control unit generates a pulse width modulated signal for supplying the windings of the direct current motor.

13. Method according to claim 12, wherein the said additional pulse width modulated signal is variable.

14. Arrangement for controlling a direct current motor in a fan unit, which arrangement comprises:
   a first control unit that is external in relation to the said fan unit;
   a communication link between the said first control unit and the said fan unit;
   a second control unit arranged in association with the said fan unit and arranged to generate a supply signal for the said direct current motor on the basis of a control signal generated by the first control unit and transmitted via the said communication link and on the basis of a supply voltage;
   wherein the communication link is arranged to transmit the supply voltage together with the said control signal.

15. Arrangement according to claim 14, wherein the said control signal is a binary data signal.

16. Arrangement according to claim 14, wherein the said fan unit is arranged for ventilation of vehicle seats.

17. Arrangement according to claim 14, wherein the said fan unit also comprises means for detecting speed of rotation.

18. Arrangement according to claim 14, wherein the said second control unit is arranged internally in relation to the said fan unit.

19. Arrangement according to claim 14, wherein it comprises at least two fan units that are connected either in series or in parallel.

20. Arrangement according to claim 14, wherein it comprises a circuit with a diode and a capacitor that are utilized when supplying the said control signal to the direct current motor while the supply voltage to the direct current motor is maintained.

21. Vehicle seat wherein it is equipped with an arrangement according to claim 14.

22. Arrangement according to claim 14, wherein the said fan unit is arranged for control of speed of rotation of the direct current motor by means of pulse width modulation.

* * * * *